United States Patent [19]

Yelland et al.

[11] Patent Number: 4,494,163
[45] Date of Patent: Jan. 15, 1985

[54] ELECTRIC SWITCHING SURGE PROTECTION

[75] Inventors: Christopher P. Yelland, Montroux; Rapha E. Pretorius, Pretoria, both of South Africa

[73] Assignee: Yelland Engineering (Proprietary) Ltd., South Africa

[21] Appl. No.: 404,296

[22] Filed: Aug. 2, 1982

[30] Foreign Application Priority Data

Aug. 4, 1981 [ZA] South Africa ............... 81/5341

[51] Int. Cl.³ ................ H02H 1/04; H02H 9/04
[52] U.S. Cl. ............................... 361/56; 361/91; 361/110; 361/117; 361/127
[58] Field of Search ................ 361/23, 30, 33, 56, 361/91, 110, 111, 113, 127, 2, 8, 117, 119; 307/540, 542, 543, 545, 549, 564; 333/172

[56] References Cited

U.S. PATENT DOCUMENTS

| | | | |
|---|---|---|---|
| 2,246,926 | 6/1941 | Roman | 361/110 X |
| 3,532,901 | 10/1970 | Hylten-Cavallius et al. | 361/56 X |
| 4,156,838 | 5/1979 | Montagoe | 361/110 X |
| 4,271,446 | 6/1981 | Comstock | 361/56 |

FOREIGN PATENT DOCUMENTS

| | | | |
|---|---|---|---|
| 591832 | 1/1934 | Fed. Rep. of Germany | 361/118 |
| 982605 | 6/1951 | France | |
| 2327675 | 6/1977 | France | 361/56 |
| 2386175 | 10/1978 | France | |
| 369306 | 3/1932 | United Kingdom | |
| 1107827 | 3/1968 | United Kingdom | 361/56 |
| 512546 | 4/1976 | U.S.S.R. | 361/56 |
| 725143 | 3/1980 | U.S.S.R. | 361/91 |

OTHER PUBLICATIONS

"A Basic Guide to RC Surge Suppression on Motors and Transformers"-R. E. Pretorius et al.; Transactions of the South African Institute of Electrical Engineers, Aug. 1980.

"The Suppression of Internal Voltage Surges in Industrial High Voltage Systems"-R. E. Pretorius; The Certified Engineer, Jul. 1981.

"Optimised Surge Suppression on High Voltage Vacuum Contactor Controlled Motors"-R. E. Pretorius; IEE Conference on Sources and Effects of Power System Disturbances, London, May 1982.

*Primary Examiner*—Harry E. Moose, Jr.
*Attorney, Agent, or Firm*—Finnegan, Henderson, Farabow, Garrett & Dunner

[57] ABSTRACT

An electric switching surge protector comprising a non-linear, voltage and frequency sensitive RC network connectable between earth and a phase of a switch controlled, AC electric load circuit. The RE network includes a linear resistance component; a non-linear resistance component connected in parallel with the linear resistance component and having a pre-determined knee-point voltage value; and a capacitance component connected in series with the parallel connected linear and non-linear resistance components. The capacitance component is operative to decouple the resistance components from the circuit at power supply frequency but to couple the combined resistive impedance of the parallel connected linear and non-linear resistance components effectively into the circuit under high frequency conditions. The capacitance component is further operative to increase the rise time of that portion of a steep fronted surge which exceeds the knee-point voltage value of the non-linear resistance component.

20 Claims, 3 Drawing Figures

ELECTRIC SWITCHING SURGE PROTECTION

This invention relates to electric switching surge protection.

It is known that during the switching of a medium or high voltage [typically from 1 kV to 11 kV], switch controlled, cable connected, electric motor circuit the following types of transient voltages may be encountered.

[a] A steep wavefront is injected at the instant of a prestrike or a restrike into the load cable which is connected to the motor terminals. This wavefront may increase in magnitude by up to two times upon its refraction at the motor terminals. Because of its very short rise time [typically 0.2 to 1 microseconds], it is known to stress the interturn and/or intercoil insulation of the line-end coils of the motor windings. It is also known that this type of electrical transient generally constitutes the most severe form of insulation stressing encountered in the switching of high voltage motors.

[b] In the case of motors controlled by air, oil, SF6 or similar switchgear which do not interrupt at high frequency current zeros, a switch-on operation is usually accompanied by a single pre-strike on each phase. The magnitude of the associated steep wavefront impressed on the motor input terminals could be as high as four times the nominal peak phase-to-earth voltage of the system.

[c] In the case of motors controlled by vacuum or similar switchgear capable of interrupting at high frequency current zones, the switch-on operation is usually accompanied by sequential multiple pre-striking [i.e. re-ignitioning]. The magnitudes of the associated steep wavefronts imposed on the motor input terminals could exceed four times the nominal peak phase-to-earth voltage of the system.

[d] Overvoltages which are generated when an LC circuit is de-energized. The transient surge voltage generated within the load subsequent to de-energisation is made up of two components which are of the same frequency, but which are 90 electrical degrees out of phase. The one component comprises a load recovery transient which occurs when the energy stored within the load circuit capacitance is re-distributed and/or is dissipated within a three phase RLC load circuit upon de-energisation. This change in capacitive charge generally occurs in the form of a lightly damped oscillation. The other component is normally referred to as a current chopping surge and results from energy trapped within the inductive load winding when the inductive current is interrupted at a finite value, and this energy is dissipated within the three phase RLC load circuit in an oscillation of a similar frequency to the first component, but 90 electrical degrees out of phase. The overvoltages thus generated are generally of a medium frequency [typically 1 to 10 kHz] and result in stressing of the motor winding to earth insulation.

[e] Re-striking [i.e. re-ignitioning] may occur when the motor is de-energised during starting. This usually applies to all types of switchgear. The associated steep wavefronts imposed on the motor terminals may have magnitudes in excess of five times the nominal peak phase-to-earth voltage of the system.

[f] Sequential multiple re-striking [i.e. re-ignitioning] transients which may occur in circuits controlled by vacuum switchgear or other types of switchgear capable of interrupting high frequency currents, and which are generally associated with escalation of the inductive load current and therefore of the peak values of successive de-energisation surge voltages. This phenomenon is particularly associated with multiple re-striking during stalled tripping [i.e. when a motor's starting current is interrupted] and may increase significantly the magnitudes of the steep wavefronts associated with such re-strikes.

[g] An increase of re-strike voltages in the manner described in [f] above may often result in forced current interruption [also referred to as "virtual current chopping"] of one or both of the adjacent phases. The phenomenon causes surges which may have very severe consequences and should be avoided at all costs.

Surge arrestors are often employed to limit overvoltage surges to a level below the overvoltage surge withstand level with respect to earth potential of the load. However, steep wavefronts which represent abrupt changes in voltage without reference to earth potential can result in severe stressing of the inter-turn insulation of motor windings without exceeding the surge arrestor protection level which is defined with respect to earth potential. As such, surge arrestors or similar voltage limiting devices do not normally offer adequate protection against steep fronted surges.

It is also known that undamped surge capacitors may be included at either end of the load cable to slope steep wavefronts [i.e. to increase the wavefront risetime] to acceptable values and also to decrease the overall load surge impedance and thus the magnitude of the current chopping surge component. However, the use of an undamped surge capacitor suffers from the following disadvantages:

[i] It does not eliminate multiple re-striking.

[ii] It provides a low impedance capacitive coupling at high frequencies between phases and may therefore increase the probability of forced current interruption [i.e. virtual current chopping] of the adjacent phases in circuits controlled by vacuum or similar switchgear. It is well known that the latter is a particularly severe phenomenon which can generally not be tolerated in motor circuits.

[iii] If more than one load circuit in a particular system includes an undamped surge capacitor, the high frequency inrush current associated with a pre- or re-strike in the circuit being switched may be excessively high and may eventually result in failure of the surge capacitor.

A parallel connection combination of a surge arrester and an undamped surge capacitor may be able to avoid or at least minimize the disadvantage resulting from virtual current chopping if the combination is located close to the load terminals, but it retains the disadvantage described in sub-paragraph [iii] above and also has the additional disadvantages of relatively high cost and relatively large size.

It is also known to use damped surge capacitors for surge suppresion. A conventional damped surge capacitor comprises a capacitor which has a typical capacitance value of 0.2 to 0.5 mfd and which is connected in series with a damping resistor having a typical resistance value of a hundred ohms or more.

If correctly applied, a conventional damped surge capacitor offers effective protection against the effects of medium frequency switching surges in a wide variety of motor circuits. The role of such a device may be summarised as follows:

[a] It increases the capacitance-to-earth of the load and therefore decreases the overall load surge impedance [$Z_o = \sqrt{L/C}$, where L is the load inductance and C is the total load capacitance-to-earth]. The peak medium frequency current chopping surge is therefore accordingly reduced. [$V_c = I_o Z_o$, where $I_o$ is the inductive load current interrupted by the switch].

[b] A critically damped surge capacitor, inserted at any point in the load circuit, serves to dampen the combined medium frequency de-energisation surges [i.e. both the load recovery and current chopping surges]. For this purpose the value of the series damping resistance should be of the order of two times $\sqrt{L/C_s}$, where L is the load inductance and $C_s$ is the value of inserted surge capacitance. Typical resistance values for this application lie in the range from about 100 to 1000 ohms. A critically damped surge capacitor may drastically reduce the magnitude of a de-energisation surge whilst at the same time decreasing the frequency of such a surge [i.e. increasing its time-to-peak] by as much as five times. This lowers the probability of a re-strike occurring.

However, a conventional damped surge capacitor suffers from the disadvantages that it is relatively large in size and relatively expensive. Furthermore, it does not reduce effectively the magnitudes of high frequency wavefronts which are imposed on a motor in the course of pre- and re-striking. It also does not eliminate multiple pre- and re-striking.

It is also known to provide an RC surge suppressor comprising a surge capacitor which has a typical capacitance value of 0.1 to 0.3 mfd and which is connected in series with a resistor having a typical resistance value lying in the range from about 50–100 ohms.

A conventional RC surge suppressor should preferably be located close to the motor terminals and its function may be summarised as follows:

[a] The capacitive component serves firstly to lower the overall load surge impedance and thus reduces the peak magnitude of the current chopping surge component.

[b] Secondly, the RC surge suppressor serves to provide a sufficiently long charging time constant $R_s C_s$ [where $R_s$ and $C_s$ are the respective values of inserted damping resistance and surge capacitance] in order to prolong the restrike current and render it aperiodic.

[c] With the RC surge suppressor connected close to the motor terminals, the series resistor is intended firstly to reduce the magnitude of the refracted voltage wavefront, and secondly to extend and render the high frequency restrike current aperiodic in order to suppress multiple restriking and voltage escalation in circuits controlled by vacuum contactors and similar switching devices.

The following disadvantages are often associated with the use of conventional RC surge suppressors:

[i] They are relatively large in size and serious practical difficulties are often experienced in the installation of these large devices sufficiently close to the motor terminals. Even if connected to the motor by cable, problems are often encountered in suitably enclosing these devices outdoors or in hazardous or polluted areas.

[ii] An RC suppressor reduces the ratio between the magnitude of a steep wavefront [as seen by the motor] and the pre- or re-strike voltage, to a fixed value, typically 1 to 1.2. However, an RC suppressor does not impose a definite limit on the magnitude of a steep fronted surge that can impinge on the motor terminals.

[lll] An RC suppressor does not increase the rise time of a steep fronted voltage surge.

It is an object of the present invention to provide improved surge protection for switch controlled load circuits.

According to the invention a surge protector comprises an RC network adapted to be connected between earth and a phase of a switch controlled, AC electric load circuit, characterized in that the RC network includes a linear resistance component having a substantially linear V-I characteristic; a non-linear resistance component connected in parallel with the linear resistance component and having a pre-determined knee-point voltage value; and a capacitance component connected in series with the parallel connected linear and non-linear resistance components, the capacitance component being operative to decouple the resistance components at least partially from the circuit at power supply frequency but to couple the combined resistive impedance of the parallel connected linear and non-linear resistance components effectively into the circuit at frequencies associated with wavefront rise times of up to 2.0 microseconds and the capacitance component further being operative to increase the rise time of that portion of a steep fronted surge which exceeds the knee-point voltage value of the non-linear resistance component.

For the purposes of this specification, the term "non-linear resistance" is used to signify a resistance having a non-linear V-I characteristic with relatively high resistance values at voltages up to a predetermined voltage value which is referred to herein as the "knee-point voltage value", and with decreased resistance values at voltages in excess of the knee-point voltage value.

The non-linear resistance component may have any suitable V-I characteristic in regard to the resistance values at voltages below the knee-point voltage value, the actual knee-point voltage value and the resistance values at voltages in excess of the knee-point value. The knee-point voltage value may be selected to suit the relevant insulation characteristics of the load to be protected.

A surge protector according to the invention may be used in a load circuit in which the load terminals are directly connected to a switch, but is particularly applicable to load circuits in which the load terminals are connected to a switch by means of a load cable.

In a surge protector according to the invention which is adapted to protect a load circuit including a load and a cable connecting the load to a switch, the linear resistance component of the RC network may have a resistance of up to four times the surge impedance of the load cable.

Further according to the invention there is also provided a surge protected 3-phase AC electric load circuit including a load; a switch connected to the load; and a surge protector according to the invention for each phase of the load circuit which is connected between the phase and earth.

The switch may be connected directly to the load or by means of one or more load cables.

Where the switch is cable connected to the load, each RC network according to the invention is preferably connected to an associated load input terminal in a position at or near the load.

Each RC network may be connected to the associated load input terminal by a separate cable having a length of not more than 5 meters and a surge impedance of not more than twice the surge impedance of the cable connecting the switch to the load terminals.

The invention is applicable to load circuits operable at line voltages of about 1 kV and higher. The invention is particularly suitable for motor and other load circuits operable at line voltages in the range from 1 kV to 11 kV, but may also be used at higher line voltages, such as in arc furnace transformer circuits which may operate at line voltages of 33 kV or even higher.

In a switch controlled, cable connected load circuit adapted to operate at a line voltage of at least 1 kV, the role of the linear resistance is to terminate the load cable at the high frequencies associated with pre-strikes and re-strikes and thus to prevent voltage doubling of travelling waves and to minimize the reflected current component.

The linear cable terminating resistance component may have a resistance lying in the range from about one to three times the surge impedance of the cable.

The principal role of the series connected capacitance component is to decouple the resistance components during normal operation at the normal power supply frequency, thereby to minimize the steady state voltage across the resistance components. However, at the high frequencies associated with travelling waves, the impedance of the capacitance component is sufficiently low to couple the combined resistive impedance of the parallel connected linear and non-linear resistance components effectively into the load circuit.

The capacitance component may have a value to couple the combined resistive impedance effectively into the circuit at frequencies associated with wavefront rise times in the range from about 0.2 to 1.0 microsecond.

For a nominal power supply frequency of 50 Hz or 60 Hz the value of the capacitance component may be in the range from 0.02 to 0.3 microfarad and preferably in the range from 0.05 to 0.2 microfarad.

With a power supply frequency of 50 Hz or 60 Hz and a capacitance value in the range from 0.02 to 0.3 microfarad, the value of the linear resistance component may lie in the range from 10 to 75 ohms.

The non-linear resistance component which is connected in parallel with the linear resistance component has a pre-determined knee-point value which refers to that voltage value above which its effective resistance reduces rapidly with increasing current. Should a high frequency [i.e. steep fronted] surge voltage exceed the knee-point voltage value of the non-linear resistance component, the resistance of the latter decreases sufficiently for the resultant resistance of the parallel combination of the non-linear resistance component and the linear resistance component which is connected in series with the capacitance component, to become sufficiently low for the capacitance component to act effectively as a wave sloping capacitor and to increase the rise time of that portion of a steep fronted surge which exceeds the knee-point voltage value of the non-linear resistance component.

The non-linear resistance component may comprise a zinc oxide element or any other suitable element, such as a silicon carbide element or a spark gap, which has a non-linear V-I characteristic.

The knee-point voltage value of the non-linear resistance component may typically lie in the range from about 0.5 to 2 times the nominal peak phase-to-earth voltage of the system.

Preferably, the linear resistance, the non-linear resistance and the capacitance are substantially non-inductive.

By connecting the non-linear resistance component in parallel with the linear resistance component, a non-linear, voltage and frequency sensitive RC surge protector network may be obtained.

At the normal power supply frequency of the system the capacitance component acts to decouple the parallel combination of the linear resistance and the non-linear resistance at least partially from the circuit.

At the medium frequencies associated with oscillatory load de-energisation transients, the peak transient current through and the peak voltage across the linear resistance is sufficiently low so that the knee-point voltage value of the non-liner resistor is not exceeded. Under medium frequency conditions the characteristics of the combined non-linear RC surge protector network according to the invention, are therefore similar to a conventional RC surge suppressor with similar linear resistance and series capacitance values.

Under high frequency conditions and for steep fronted surge voltages not exceeding the knee-point voltage value of the non-linear resistance component, the characteristics of the non-linear RC surge protector network according to the invention are similar to that of a conventional RC surge suppressor with similar linear resistance and capacitance values.

Under high frequency conditions and for steep fronted surge voltages exceeding the knee-point voltage value of the non-linear resistance component, the rise time of that portion of the steep fronted surge which exceeds the knee-point voltage value of the non-linear resistance component is increased. Thus, a non-linear RC surge protector network according to the invention acts effectively as a wave sloping device for that portion of a steep fronted surge voltage which exceeds the knee point voltage value of the non-linear resistance component.

The high frequency surge current in the capacitance component of the invention is essentially of an aperiodic nature with a relatively short duration. Under severe conditions where a high frequency [i.e. steep fronted] surge voltage exceeds the knee-point voltage value of the non-linear resistance component so that the capacitance component acts effectively as a wave sloping capacitor, both the peak value and duration of the surge current in the capacitance component of the invention is less than that in a conventional undamped surge capacitor. In addition, unlike a conventional undamped surge capacitor, an RC network according to the invention does not substantially increase the probability of high frequency capacitive coupling between phases.

A non-linear RC surge protector network according to the invention is capable not only of minimising the voltage doubling effects associated with the refraction at the load terminals of steep fronted travelling waves in cable connected motor circuits, but also of modifying the reflection and refraction of such steep fronted travelling waves in order:

[i] to suppress multiple pre- and re-striking in high voltage motor circuits switched by vacuum switchgear or other switchgear capable of interrupting high frequency pre- and re-strike currents; and

[ii] to limit the magnitude of a steep fronted voltage surge travelling along a load cable and impinging on the load terminals, to a predetermined voltage value and also to increase to an acceptable value the rise time of that portion of a steep fronted voltage surge impinging on the load terminals which exceeds the predetermined knee-point voltage value of the non-linear resistance component.

It will be appreciated that the capacitance component of the invention effectively decouples both the linear resistance and the non-linear resistance from the circuit at normal power supply frequency so that the power rating and size of these components may be reduced. The non-linear resistance only becomes active under high frequency conditions when its knee-point voltage value is exceeded and its resistance decreases, so that its required energy handling capability is minimized.

Preferably, the value of the capacitance component of the invention is as small as possible commensurate with effective coupling of the combined resistive impedance into the circuit at the high frequencies associated with steep fronted travelling waves, in order to minimize current flow through and power losses in the linear resistance and in the non-linear resistance during normal operation at the normal power supply frequency of the system, thereby to minimize the respective power ratings of the linear resistance and the non-linear resistance.

With a power supply frequency of 50 Hz or 60 Hz and a decoupling capacitance value in the range from 0.05 to 0.2 microfarad, the value of the linear resistance may lie in the range from 10 to 75 ohms with a typical continuous power dissipation of about 1 mW to 12 W in a system operating at a line voltage in the range from 1 kV to 11 kV. With such an arrangement, the maximum energy dissipated in the non-linear resistance during a pre- or re-strike when the knee-point voltage value is exceeded, is typically less than 200 Joules.

Preferably, a surge protector according to the invention is locatable in the terminal box of the load for connection to the load input terminals.

In the case of a 3-phase system, a surge protector according to the invention may be provided for each phase at or near the load end of a load cable.

The invention is particularly, but by no means exclusively, applicable to vacuum switching devices. The invention is particularly suitable for electric motor protection, but may be applied to protect any suitable switch controlled load, particularly an inductive load. Thus, a surge protector according to the invention may be used in a transformer load circuit where a need exists for the reduction of high frequency voltage surges.

With the arrangement according to the invention there may be provided a non-linear RC surge protector network which is capable of reducing and limiting the magnitude of steep voltage wave fronts in cable connected motor circuits and which may be sufficiently small in physical size to be located inside a motor terminal box and be connected to the motor input terminals.

In the majority of high voltage motor circuits, non-linear surge protectors according to the invention may be used to replace conventional surge capacitors and surge suppressors.

The connection of a non-linear surge protector according to the invention to the load input terminal of each phase of a motor serves to minimize and limit the magnitudes of steep wave fronts associated with pre- and re-strikes and also, where applicable, eliminating multiple pre- and re-striking, thereby to provide adequate protection against switch-on and switch-off surges.

Where applicable, the capacitance component of a non-linear RC surge protector according to the invention, may be increased up to a value of about 0.3 microfarad. This modified arrangement may, for example, be applied where a need exists for additional protection against severe stalled tripping surges, such as where a motor is required to perform inching duties. However, in this case it is possible that the non-linear RC surge protector may not be of sufficiently small dimensions to be fitted inside the motor terminal box and it may have to be positioned close to the motor. It does, however, still have the additional advantage over a conventional RC surge suppressor in that the magnitudes of steep wavefronts are limited to a predetermined level, typically of the order of twice the nominal peak phase-to-earth voltage of the system.

A surge protector according to the invention may also be used in conjunction with a conventional damped surge capacitor. With such an arrangement the damped surge capacitor serves to dampen medium frequency surges while the surge protector according to the invention serves to reduce the magnitudes of any remaining high frequency pre- or restrike voltage wavefronts.

A surge protector according to the invention may also be used in conjunction with conventional gapped or gapless surge arrestors where additional overvoltage protection is required.

The invention is applicable not only to cable connected load circuits but also to load circuits in which switch means is connected directly to the load without a load cable.

A surge protector according to the invention may be connected to the input terminals of the load cable in cases where it is not practically possible to connect the surge protector to the load terminals in a position at or near the load terminals. If a surge protector according to the invention is connected to the input terminals of the load cable it will reduce effectively the magnitude and increase effectively the rise time of a steep fronted voltage surge injected into the load cable.

For a clear understanding of the invention, preferred embodiments will now be described purely by way of example with reference to the accompanying drawings in which.

Figure 1:
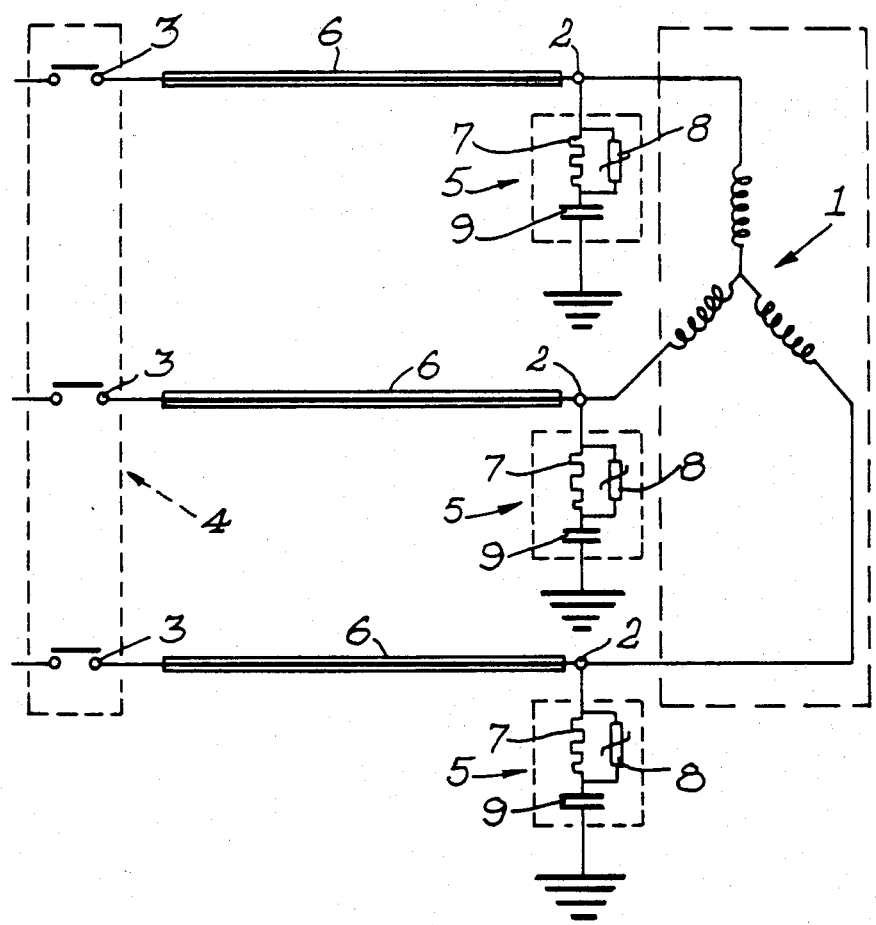
FIG. 1 is a simplified circuit diagram of a 3-phase, switch controlled, cable connected, load circuit including non-linear RC surge protectors according to the invention which are connected to the load terminals.
Figure 2:
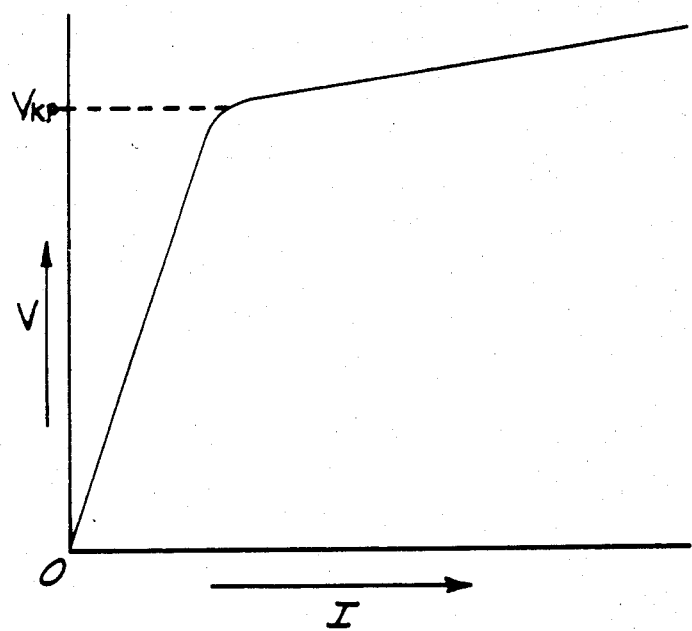
FIG. 2 is a diagrammatic representation of a typical V-I characteristic of a non-linear resistance element used in the circuit of FIG. 1.

Referring first to FIGS. 1 and 2 of the accompanying drawings, the load circuit comprises a 3-phase inductive load 1 with an input terminal 2 for each phase. Load 1 is adapted to operate at a line voltage lying in the range from 1 kV to 11 kV or higher. The input terminal 2 of each phase of load 1 is connected by means of a load cable 6 to a load-side terminal 3 of a 3-phase switching device 4 which is located remotely from load 1 and which provides a switch for each phase. Load cables 6 may comprise single core cables or may comprise 3-core cables.

A non-linear RC surge protector 5 according to the invention is provided for each phase of the load circuit. Each surge protector 5 is connected at the load end of the associated cable 6 to the associated input terminal 2 of load 1 and also to earth. It will be appreciated that each non-linear surge protector 5 is connected between a phase of the load circuit and earth.

Each surge protector 5 comprises a non-linear, voltage and frequency dependent RC network comprising a substantially non-inductive linear resistance 7 having a substantially linear V-I characteristic; a substantially non-inductive zinc-oxide or other suitable non-linear resistance element 8 connected in parallel with the linear resistance 7, and a substantially non-inductive capacitor 9 which is connected in series with the parallel combination of the linear resistance 7 and the non-linear resistance 8.

As can be seen from FIG. 2, the non-linear resistance 8 has a non-linear V-I characteristic with relatively high resistance values at voltages up to the knee-point voltage value Vkp and with substantially decreased resistance values at voltages in excess of the knee-point voltage value Vkp. This characteristic of voltage dependent, non-linear resistance elements is well known.

Each resistance 7 has a resistance $R_s$ lying in the range from one to four times $Z_c$ where $Z_c$ is the surge impedance of the associated load supply cable 6. Each non-linear resistance 8 has a knee-point voltage value Vkp in the range from 0.5 to 2 times the peak nominal phase-to-earth voltage of the system. The value of each capacitor 9 may lie in the range from 0.02 to 0.3 microfarad and preferably in the range from 0.05 to 0.2 microfarad for a power supply frequency of 50 Hz or 60 Hz and the value of each linear resistance 7 may lie in the range from 10 to 75 ohms.

It will be appreciated that many variations in detail are possible without departing from the spirit of the invention. For example, the inductive load 1 may comprise an electric motor or a transformer with star (wye) or delta connected windings.

Where load 1 comprises an electric motor requiring additional protection against severe stalled tripping surges, such as where the motor is required to perform inching duties, each capacitor 9 may have a value of up to 0.3 microfarad for a power supply frequency of 50 Hz or 60 Hz and the value of each linear resistance 7 may lie in the range from 10 to 75 ohms, each non-linear resistance 8 having a knee-point voltage value lying in the range from 0.5 to 2 times the peak nominal phase-to-earth voltage of the system.

Instead of switching device 4 being connected to load terminals 2 by means of load cables 6, the load cables 6 may be dispensed with in certain circumstances and the load-side terminals 3 of switching device 4 may be connected directly to load terminals 2. Each surge protector 5 may be connected directly to its associated load terminal 2 as before.

Figure 3:
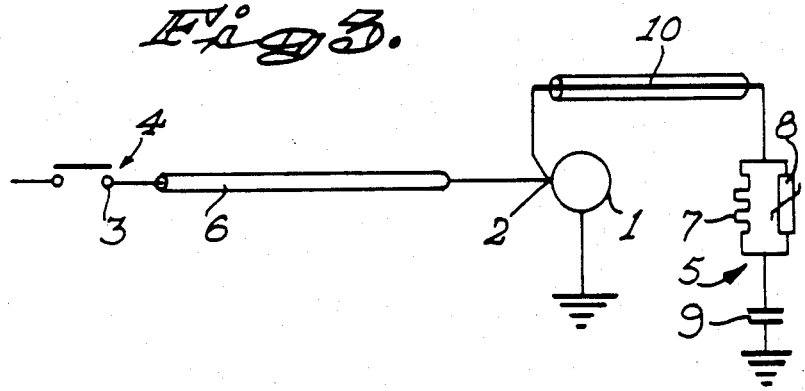
FIG. 3 is a simplified circuit diagram of one phase of a 3-phase, switch controlled, cable connected load circuit including a non-linear RC surge protector according to the invention which is connected to the load terminal by means of a separate cable.

The arrangement of FIG. 3 is similar to that of each of the phases of the arrangement of FIG. 1, with the exception that the non-linear RC surge protector 5 of FIG. 3 is connected to the load input terminal 2 by means of a separate cable 10. The surge impedance Zc2 of the separate cable 10 should not exceed about 2Zc where Zc is the surge impedance of the load supply cable 6 and the length of the separate cable 10 should not exceed about 5 meters. The resistance value of the linear resistance 7, the knee-point voltage value of the non-linear resistance 8 and the capacitance value of capacitor 9 may lie in the ranges specified above in relation to the arrangement of FIG. 1.

Instead of each surge protector 5 being connected to the associated load input terminal 2 at the load end of the load cable 6 as shown in FIGS. 1 and 3, the surge protector 5 of each phase may be connected to the associated load-side switch terminal 3 in a position at or near the switch end of the associated load cable 6. Each surge protector 5 may be connected to the associated load-side terminal 3 of switching device 4 and to earth so that the surge protector 5 is connected between a phase of the circuit and earth.

In a 3-phase load circuit as shown in FIG. 1, the surge protector 5 of each phase may be located in its own enclosure as a self-contained unit. Alternatively, the three surge protectors 5 of the three phases may be located in a common enclosure.

We claim:

1. An electric surge protector for use in a switch controlled, AC electric load circuit which is operable at a voltage of at least 1 kV and which comprises a load and a load cable connecting the load to switch means, the electric surge protector comprising:
   an RC network connectable between earth and a phase of the load circuit, the RC network comprising:
      a linear cable terminating resistance component having a substantially linear V-I characteristic;
      a non-linear resistance component connected in parallel with the linear resistance component and having a predetermined knee-point voltage value; and
      a capacitance component connected in series with the parallel connected linear and non-linear resistance components, the capacitance component being operative to decouple the resistance components at least partially from the circuit at power supply frequency but to couple the combined resistive impedance of the parallel connected linear and non-linear resistance components effectively into the circuit at frequencies associated with wavefront rise times of up to 2.0 microseconds and the capacitance component further being operative to increase the rise time of that portion of a steep fronted surge which exceeds the knee-point voltage value of the non-linear resistance component.

2. A surge protector as claimed in claim 1, wherein the linear resistance component of the RC network has a resistance of up to four times the surge impedance of the load cable.

3. A surge protector as claimed in claim 2, wherein the linear resistance component of the RC network has a resistance lying in the range from one to three times the surge impedance of the load cable.

4. A surge protector as claimed in claim 1 or claim 2 or claim 3, wherein the capacitance component of the RC network is operative to couple the combined resistive impedance of the parallel connected linear and non-linear resistance components effectively into circuit at frequencies associated with wavefront rise times in the range from 0.2 to 1.0 microsecond.

5. A surge protector as claimed in claim 1 or claim 2 or claim 3, wherein the value of the capacitance component of the RC network lies in the range from 0.02 microfarad to 0.3 microfarad.

6. A surge protector as claimed in claim 5, wherein the value of the capacitance component lies in the range from 0.05 microfarad to 0.2 microfarad.

7. A surge protector as claimed in claim 5, characterized in that the value of the linear resistance component lies in the range from 10 to 75 ohms.

8. A surge protector as claimed in claim 1 or claim 2 or claim 3, wherein the knee-point voltage value of the non-linear resistance component of the RC network lies in the range from 0.5 to 2 times the nominal peak phase-to-earth voltage of the system.

9. An electric surge protector for use in a switch controlled, AC electric load circuit which is operable at a voltage of at least 1 kV and which comprises a load and a load cable connecting the load to switch means, the electric surge protector comprising:
 an RC network connectable between earth and a phase of the load circuit, the RC network comprising:
  a linear cable terminating resistance component having a substantially linear V-I characteristic and a resistance lying in the range from 10 to 75 ohms;
  a non-linear resistance component connected in parallel with the linear resistance component and having a knee-point voltage value lying in the range of from 0.5 to 2 times the nominal peak phase-to-earth voltage of the load circuit; and
  a capacitance component connected in series with the parallel connected linear and non-linear resistance components, the capacitance component having a capacitance lying in the range from 0.02 microfarad to 0.3 microfarad.

10. A surge protected, 3-phase AC electric load circuit which is operable at a line voltage of at least 1 kV and which comprises a load; switch means; a load cable connecting the switch means to the load; and a surge protector for each phase of the load circuit comprising an RC network connected between the phase and earth, characterized in that each RC network comprises:
 a linear cable terminating resistance component having a substantially linear V-I characteristic;
 a non-linear resistance component connected in parallel with the linear resistance component and having a predetermined knee-point voltage value; and
 a capacitance component connected in series with the parallel connected linear and non-linear resistance components, the capacitance component being operative to decouple the resistance components at least partially from the circuit at power supply frequency but to couple the combined resistive impedance of the parallel connected linear and non-linear resistance components effectively into the circuit at frequencies associated with wavefront rise times of up to 2.0 microseconds and the capacitance component further being operative to increase the rise time of that portion of a steep fronted surge which exceeds the knee-point voltage value of the non-linear resistance component.

11. A surge protected load circuit as claimed in claim 10, wherein the linear resistance component of each RC network has a resistance of up to four times the surge impedance of the load cable.

12. A surge protected load circuit as claimed in claim 11, wherein the resistance component of each RC network has a resistance lying in the range from one to three times the surge impedance of the load cables.

13. A surge protected load circuit as claimed in claim 10 or claim 11 or claim 12, wherein each RC network is connected to an input terminal of the load.

14. A surge protected load circuit as claimed in claim 13, wherein each RC network is connected to its load input terminal by a separate cable having a length of not more than 5 meters and a surge impedance of not more than twice the surge impedance of the load cable.

15. A surge protected load circuit as claimed in claim 10 or claim 11 or claim 12, wherein the capacitance component of each RC network is operative to couple the combined resistive impedance of the parallel connected linear and non-linear resistance components effectively into circuit at frequencies associated with wavefront rise times in the range from 0.2 to 1.0 microsecond.

16. A surge protected load circuit as claimed in claim 10 or claim 11 or claim 12, wherein the value of the capacitance component of each RC network lies in the range from 0.02 microfarad to 0.3 microfarad.

17. A surge protected load circuit as claimed in claim 16, wherein the value of the capacitance component of each RC network lies in the range from 0.05 to 0.2 microfarad.

18. A surge protected load circuit as claimed in claim 16, wherein the value of the linear resistance component lies in the range from 10 to 75 ohms.

19. A surge protected load circuit as claimed in claim 10 or claim 11 or claim 12, wherein the knee-point voltage value of the non-linear resistance component of the RC network lies in the range from 0.5 to 2 times the nominal peak phase-to-earth voltage of the system.

20. A surge protected, 3-phase AC electric load circuit which is operable at a line voltage of at least 1 kV and which comprises a load; a switch means; a load cable connecting the switch means to the load; and a surge protector for each phase of the load circuit comprising an RC network connected between the phase and earth, characterized in that each RC network comprises:
 a linear cable terminating resistance component having a substantially linear V-I characteristic and a resistance lying fn the range from 10 to 75 ohms;
 a non-linear resistance component connected in parallel with the linear resistance component and having a knee-point voltage value lying in the range from 0.5 to 2 times the nominal peak phase-to-earth voltage of the load circuit; and
 a capacitance component connected in series with the parallel connected linear and non-linear resistance components, the capacitance component having a capacitance lying in the range from 0.02 microfarad to 0.3 microfarad.

* * * * *